March 15, 1927.
C. P. BUCK
1,620,720
COMBINATION VACUUM AND PRESSURE RELIEF VALVE
Filed July 27, 1925
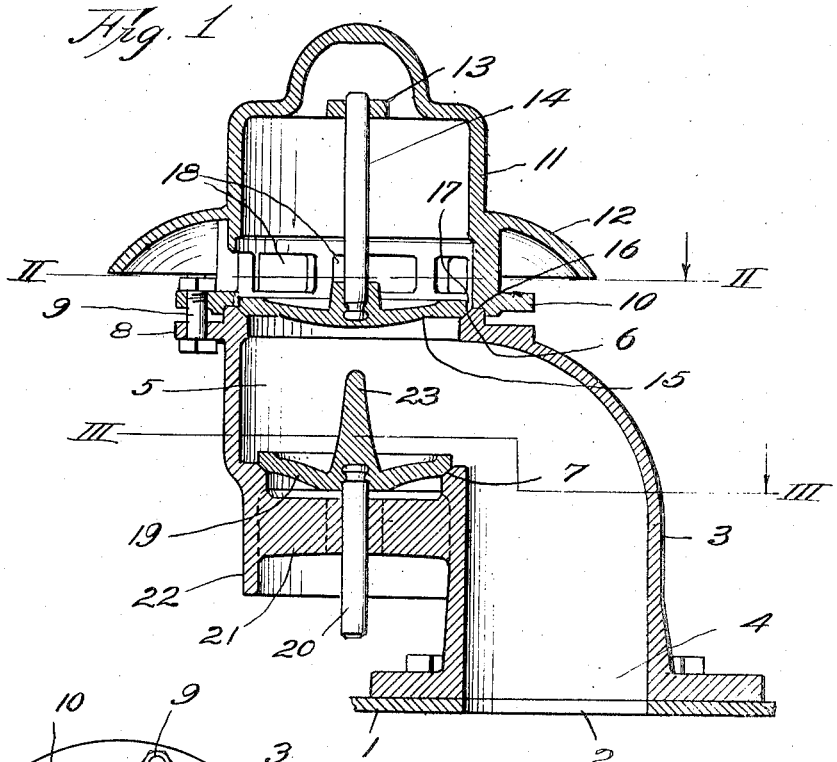
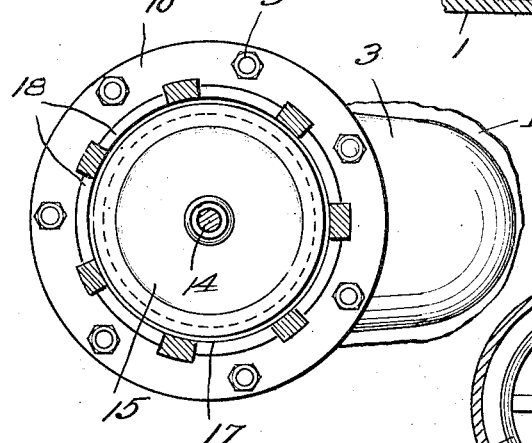
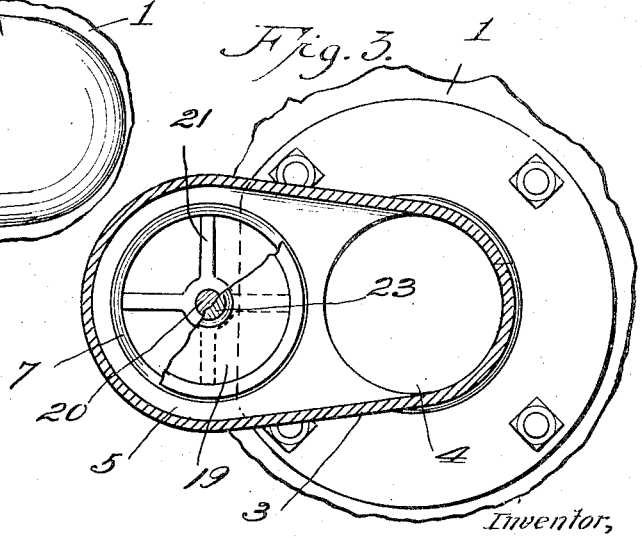
Witness:
R. E. Hamilton
Inventor,
Charles P. Buck,
By Thorpe & Levant,
Attys.

Patented Mar. 15, 1927.

1,620,720

UNITED STATES PATENT OFFICE.

CHARLES P. BUCK, OF TOPEKA, KANSAS, ASSIGNOR TO GUSTIN-BACON MANUFACTURING COMPANY, OF KANSAS CITY, MISSOURI, A CORPORATION OF MISSOURI.

COMBINATION VACUUM AND PRESSURE RELIEF VALVE.

Application filed July 27, 1925. Serial No. 46,340.

This invention relates to combination vacuum and pressure relief valve mechanism, and has for its object to provide a construction for the relief through a common opening in the top of a tank, of both internal and external pressure and thereby guard against any possibility of the wrecking of the tank by the bursting or collapse thereof and the danger and loss incidental to either contingency.

Another object is to provide a construction making provision for the operation of the pressure valve without chattering, and to provide valve guides for both valves which are at no time exposed to escaping gases which frequently render a valve inoperative by coating it with oil or by corrosion.

A further object is to provide a construction by which both vacuum and pressure valves may be simultaneously tested to see if they are in working condition, and in which the internal wall of the housing or casing is so arranged as to direct condensed vapor back into the tank.

To these ends, the invention consists in certain novel and useful features of construction and combinations of parts as hereinafter described and claimed; and in order that it may be fully understood, reference is to be had to the accompanying drawing, in which:—

Figure 1 is a central vertical section taken through a valve mechanism embodying the invention.

Figure 2 is a section on the line II—II of Figure 1.

Figure 3 is a section on the line III—III of Figure 1.

In the said drawing, where like reference characters identify corresponding parts in all of the figures, 1 indicates a tank provided with an opening 2 in its top, and secured upon the latter with an air-tight relation, is a housing 3, having an opening 4 communicating with the opening 2, and in this connection it will be noted that the internal wall of the housing is substantially vertical so that condensed vapor shall drain back into the tank.

The upper end of the housing is formed with a substantially right-angle bend and terminates in a chamber 5, the upper and lower ends of the chamber being open and respectively formed with upwardly facing valve seats 6 and 7, the former cooperating with a pressure valve and the latter with a vacuum valve hereinafter described.

The upper end of the chamber 5 is formed with an external circumferential flange 8 to which is bolted by means of a series of bolts 9, the flange 10 of a dome 11 formed with a rain or snow excluding skirt 12. A bridge piece 13 is carried by the upper end of the dome and slidingly receives one end of a valve stem 14 carrying a pressure release valve 15 normally resting on the valve seat 6 as illustrated. In this connection it will be noted that the lower margin of the dome is recessed as at 16 for fitting on the top edge of the chamber 5, and that a reduced pressure escape passageway 17 is formed between the edge of the valve and the wall of the dome, until the valve has been elevated a sufficient height to permit the pressure to escape directly through a series of pressure release ports 18 in the wall of the dome. With this construction, it will be evident if the pressure in the tank is sufficient to raise the pressure valve 15 above the lower margins of the ports 18, that the escaping vapor will pass directly outwardly through said ports. As the internal pressure in the tank is reduced the valve 15 will commence to move by gravity, and as soon as its under face passes the lower margin of the ports 18, the escaping gas is restricted to the passageway 17, its velocity is thereby greatly increased and the valve is consequently subjected to a reaction tending to let it gradually approach its valve seat 6. With this construction the hammering or chattering of the valve is obviated and the valve and its seat will give much longer service, than would otherwise be possible. It is also to be pointed out that as the valve guide 13 and valve stem 14 are entirely on the back of the valve they are protected by the valve from the escaping gas or vapor and are not likely to become gummed up or corroded and, therefore, become inoperative. The valve is limited in its opening movement by contact of its stem 14 with the top of the dome.

Fitted on the lower valve seat 7 is a vacuum valve 19 provided with a depending stem 20 slidingly received within a spider 21 carried by a tubular casing 22 downwardly projecting from the chamber 5. It will be apparent that upon the production of a vacuous condition in the tank, the valve 19 will be opened by atmospheric pressure, and in order to limit the opening movement of said valve and also to provide means for the ready simultaneous testing of both of the valves, the face of the valve 19 is formed with an upwardly extending conical stud 23.

The stud 23 is provided primarily as a means for testing the pressure valve 15 to see if it is sticking to its seat, as under normal conditions the vacuum produced in the tank will be insufficient to cause said stud to be elevated a sufficient height to contact with the face of the pressure valve, and when it is desired to so test the valves, the operator will press upwardly on the exposed lower end of the valve stem 20, thus opening the vacuum valve 19 and will continue to press upwardly, until the stud 23 contacts with and elevates the pressure valve 15, it being apparent that the contact of the upper valve stem 14 with the top of the dome will limit the opening movement of the valves so it will be impossible for the operator to throw either of them out of its respective guide.

From the above description, it will be apparent that I have produced a combination of the character set forth which possesses all of the features of advantage set forth as desirable, and while I have described and claimed the preferred embodiment of the same, I reserve the right to make all changes properly falling within the spirit and scope of the appended claim.

I claim:

A combined pressure and vacuum relief valve comprising, a valve casing formed with an open-ended vertical passageway, vacuum and pressure valves respectively closing the bottom and top of said passageway, a dome surrounding said pressure valve and having a series of pressure release ports, said dome and said ports being so arranged that the pressure valve shall close the dome when it has moved upwardly and has its lower periphery in substantially the plane of the upper edge of said ports, a valve stem for said pressure valve projecting into the dome, a guide within the dome and slidingly receiving the stem of said pressure valve, a valve stem for said vacuum valve, a guide slidingly receiving vacuum valve stem and carried by the casing, and means on said vacuum valve whereby opening movement thereof beyond a predetermined point shall effect opening movement of the pressure valve.

In witness whereof I hereunto affix my signature.

CHARLES P. BUCK.